United States Patent
Dua et al.

(10) Patent No.: US 7,686,752 B2
(45) Date of Patent: Mar. 30, 2010

(54) SILICONE ROLLING PIN

(75) Inventors: Gregory C Dua, Clark, NJ (US);
Edward J Bloom, Fair Haven, NJ (US);
Rick Sadofsky, Bellmore, NY (US)

(73) Assignee: Fiesta Products LLC, Clark, NJ (US)

( * ) Notice: Subject to any disclaimer, the term of this patent is extended or adjusted under 35 U.S.C. 154(b) by 817 days.

(21) Appl. No.: 11/301,408

(22) Filed: Dec. 13, 2005

(65) Prior Publication Data
US 2006/0094576 A1    May 4, 2006

Related U.S. Application Data

(62) Division of application No. 10/830,286, filed on Apr. 22, 2004, now Pat. No. 7,052,450.

(60) Provisional application No. 60/544,617, filed on Feb. 13, 2004, provisional application No. 60/542,308, filed on Feb. 5, 2004.

(51) Int. Cl.
*A21C 3/02* (2006.01)
(52) U.S. Cl. .................. 492/14; 492/56; 7/111
(58) Field of Classification Search .......... 492/14, 492/13, 56; 7/111; 15/230.11
See application file for complete search history.

(56) References Cited

U.S. PATENT DOCUMENTS

| 29,006 | A | 7/1860 | Rice et al. | |
|---|---|---|---|---|
| 119,062 | A | 9/1871 | Thomas | |
| 220,702 | A | 10/1879 | Cromer | |
| 1,158,111 | A | 10/1915 | Ahlheim | |
| 1,398,621 | A | 11/1921 | Braddick | |
| 1,405,920 | A | 2/1922 | Kerr | |
| 1,534,907 | A | 4/1925 | Broecker | |
| 1,807,009 | A | 5/1931 | Pinnelli | |
| 2,078,839 | A | 4/1937 | Conant | |
| 2,205,842 | A | 6/1940 | Butman | 107/50 |
| 2,683,428 | A | 7/1954 | Neal | 107/50 |
| 2,715,879 | A | 8/1955 | Sawyer | 107/12 |
| 2,783,719 | A | 3/1957 | Rhodes | 107/12 |
| 2,828,099 | A | * 3/1958 | Dessaux | 177/60 |

(Continued)

FOREIGN PATENT DOCUMENTS

CH    330111    11/1970

(Continued)

OTHER PUBLICATIONS

Supplementary European Search Report, dated Aug. 16, 2006. 2 pages.

(Continued)

*Primary Examiner*—Essama Omgba
(74) *Attorney, Agent, or Firm*—Ostrolenk Faber LLP

(57) ABSTRACT

A rolling pin including a core, a silicone-containing jacket over the core defining a rolling surface. The jacket may be of such length and so positioned on the core as to define end regions of the jacket extending beyond the ends of the core; the jacket end regions being folded inward over the ends of the core; a cap securing to the core each folded inward end region of the jacket. A handle may be at each end of the core.

17 Claims, 4 Drawing Sheets

U.S. PATENT DOCUMENTS

| | | | | |
|---|---|---|---|---|
| 3,283,395 | A | | 11/1966 | Rownd .................... 29/110.5 |
| 3,322,076 | A | * | 5/1967 | Cronheim .................... 492/14 |
| 3,605,648 | A | | 9/1971 | Petix et al. |
| 3,653,338 | A | | 4/1972 | Sauey ........................ 29/110.5 |
| 3,686,731 | A | | 8/1972 | Koori et al. |
| 3,831,238 | A | | 8/1974 | Adams ..................... 29/110.5 |
| 3,847,144 | A | | 11/1974 | Wright ........................ 128/57 |
| 4,029,046 | A | | 6/1977 | Hertel |
| 4,078,286 | A | | 3/1978 | Takiguichi et al. |
| 4,128,909 | A | | 12/1978 | Kawabe et al. ................ 15/104 |
| 4,178,200 | A | | 12/1979 | Hakert et al. |
| 4,250,605 | A | * | 2/1981 | Chapman ..................... 492/56 |
| 4,302,478 | A | | 11/1981 | Hamann .................... 426/517 |
| 4,368,240 | A | | 1/1983 | Nauta et al. |
| 4,375,349 | A | | 3/1983 | Vrbanek ................... 425/324.1 |
| 4,490,870 | A | | 1/1985 | Taub .......................... 15/1.5 |
| 4,522,580 | A | | 6/1985 | Poister ...................... 425/193 |
| 4,815,859 | A | | 3/1989 | Weinkle ...................... 366/69 |
| 4,830,893 | A | * | 5/1989 | Nakamura et al. ......... 428/35.8 |
| 4,978,486 | A | | 12/1990 | Ito et al. ...................... 264/41 |
| 5,066,507 | A | | 11/1991 | Miwa ........................ 426/481 |
| 5,068,951 | A | | 12/1991 | Abrams .................... 29/110.5 |
| 5,123,151 | A | * | 6/1992 | Uehara et al. ................ 492/56 |
| RE34,027 | E | * | 8/1992 | Nakamura et al. ......... 428/35.8 |
| 5,162,119 | A | | 11/1992 | Pappas et al. ................ 425/92 |
| 5,340,599 | A | | 8/1994 | Maruyama |
| 5,342,188 | A | | 8/1994 | Zimmermann ............. 425/235 |
| 5,361,689 | A | | 11/1994 | Lima ......................... 99/575 |
| 5,393,289 | A | | 2/1995 | Green ........................ 492/13 |
| 5,534,281 | A | * | 7/1996 | Pappas et al. ............... 426/383 |
| 5,577,995 | A | | 11/1996 | Walker et al. ............... 601/120 |
| 5,582,885 | A | * | 12/1996 | Nakamura et al. ......... 428/35.8 |
| 5,725,922 | A | * | 3/1998 | Nakamura et al. ......... 428/36.9 |
| 5,736,089 | A | | 4/1998 | Stefani |
| 6,013,201 | A | * | 1/2000 | Hayashida et al. .......... 252/511 |
| 6,197,359 | B1 | * | 3/2001 | Llorente Hompanera .... 426/523 |
| 6,585,629 | B2 | | 7/2003 | Jerstrom ..................... 492/14 |
| 6,640,866 | B2 | | 11/2003 | Kerr et al. |
| 6,691,894 | B2 | | 2/2004 | Chrisman ................... 222/101 |
| 6,797,223 | B2 | * | 9/2004 | Beale et al. ................. 264/337 |
| 7,052,450 | B2 | * | 5/2006 | Dua et al. ..................... 492/14 |
| 2003/0047838 | A1 | * | 3/2003 | Beale et al. ............... 264/328.1 |
| 2004/0148726 | A1 | | 8/2004 | Chelednik ................ 15/203.11 |
| 2005/0073573 | A1 | | 4/2005 | Kerr et al. |
| 2006/0225579 | A1 | * | 10/2006 | Errera .......................... 99/388 |
| 2007/0191200 | A1 | * | 8/2007 | Orlady ........................ 492/49 |

FOREIGN PATENT DOCUMENTS

| | | |
|---|---|---|
| DE | 59733 | 5/1891 |
| DE | 823581 | 12/1951 |
| DE | 85 08 923.0 | 10/1985 |
| DE | 87 04 729 .2 | 7/1987 |
| DE | 87 04 729.2 | 7/1987 |
| DE | 87 08 275.6 | 9/1987 |
| DE | 42 22 676 | 11/1994 |
| DE | 297 23 110 | 5/1998 |
| DE | 297 23 110 U1 | 5/1998 |
| DE | 198 55 306 | 6/2000 |
| DE | 202 02 144 U1 | 7/2002 |
| DE | 201 21 471 | 10/2002 |
| DE | 201 21 471 U1 | 10/2002 |
| FR | 1092466 | 4/1955 |
| FR | 2 756 706 | 6/1998 |
| FR | 2788405 | 7/2000 |
| FR | 2788405 A1 * | 7/2000 |
| GB | 269054 | 4/1927 |
| GB | 805202 | 12/1958 |
| JP | 57026546 A * | 2/1982 |
| JP | 6 335 431 | 12/1994 |
| JP | 6335431 | 12/1994 |

OTHER PUBLICATIONS

European Search Report, dated Aug. 3, 2007, issued in corresponding European Application No. EP07 01 2871, total 10 pages.

European Search Report, dated Aug. 3, 2006, issued in corresponding European Application No. EP 05 71 2729, total 3 pages.

* cited by examiner

FIG. 1
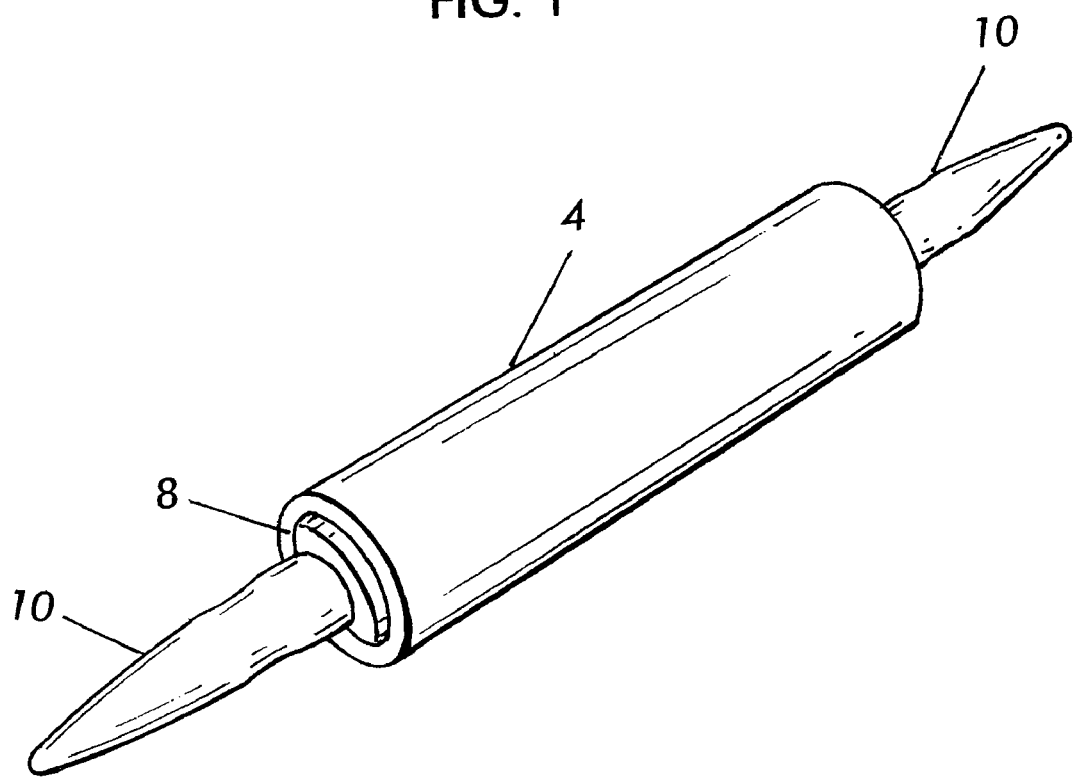
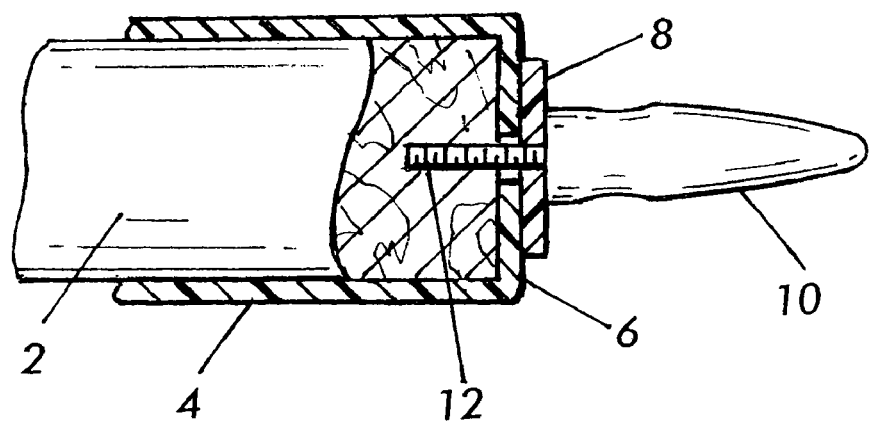
FIG. 2

SILICONE ROLLING PIN

CROSS-REFERENCE TO RELATED APPLICATIONS

This is a division of U.S. patent application Ser. No. 10/830,286, filed Apr. 22, 2004, which is based upon and claims priority of U.S. Provisional Patent Application Ser. No. 60/544,617 filed by Gregory C. Dua et al. on Feb. 13, 2004 (PP/4525-4) and U.S. Provisional Patent Application Ser. No. 60/542,308 filed by Gregory C. Dua et al. on Feb. 5, 2004 (PP/4525-2), the disclosures of which are incorporated by reference.

BACKGROUND OF THE INVENTION

1. Field of the Invention

The invention relates to a rolling pin, and more particularly to a rolling pin which uses the non-stick properties of silicone on an exterior jacket of the rolling pin.

2. Background Art

The most important use of a rolling pin is for rolling dough for making pastries, etc. It is vital that the dough does not stick to the pin when rolling. Dough sticking to the pin has the following disadvantages. (1) It takes more time to complete the job and therefore is less efficient. (2) Before and during rolling, flour must be added to the dough and rubbed on the pin to help prevent the dough from sticking. This changes the texture of the dough. (3) When the dough sticks to the pin and needs to be removed, the weight distribution of the dough becomes inconsistent, thereby creating uneven thickness and therefore uneven temperature when baking, so that some parts become more crisp than others.

It would be desirable to develop an improved rolling pin which avoids these disadvantages and allows dough to be rolled more easily than previously.

SUMMARY OF THE INVENTION

The inventors have discovered that the disadvantages of known rolling pins may be avoided by a rolling pin which incorporates a silicone material on all or part of the exterior surface that contacts the dough.

The inventors have observed that silicone is far less adherent than other surfaces currently available for use on rolling pins (such as wood, plastic, Teflon®, marble, and various metal coatings, such as stainless steel and copper coatings). Very little if any additional flour is needed when using a silicone-surfaced pin, much less than with other surfaces. Silicone, because it is less adherent, is far easier to clean and therefore it is less likely for bacteria or food to remain on the pin after it is cleaned. Silicone can be made in any color and is safe for use in food preparation.

Particularly preferred are "food-grade silicones," which are certified safe for repeated use in contact with food by the U.S. Food and Drug Administration or another certifying authority. A particularly preferred composition is a mixture of GE Bayer food-grade silicone elastomers, discussed in more detail below.

In a preferred embodiment of the invention, the jacket is made of a mixture of equal parts of two GE Bayer silicone elastomers, #SE 6070 EU LV and #SE 6033 EU LV. #6070 has a Shore A hardness of 70 and #6033 has a Shore A hardness of 33. The mixture, when cured, has a Shore A hardness of 51.5. Experiments have found that a Shore A hardness in the range of about 45-60 gives good results, neither so hard that it damages the food being rolled, nor so soft that it is itself easily damaged.

More generally, it is preferred to use a silicone material that is substantially chemically inert with respect to the food being rolled; does not affect taste or smell; is sufficiently non-stick to avoid the disadvantages of the conventional rollers; and can be formed into a jacket as described herein. One skilled in the art may be able to select other usable silicone materials, in addition to the above mentioned GE Bayer food-grade silicone elastomers, which are equivalent in the context of this invention.

The invention further extends to a jacket made of any silicone or silicone-containing material, even if not food-grade, which may be used in industrial contexts other than food preparation.

The rolling pin has a rigid central core which may be solid or hollow. The core (when hollow) is supported by a series of disks or plates spaced along its length. A roller shaft passes through the row of disks. The core has a cylindrical peripheral shell. A tubular jacket is applied to the periphery of the core. The jacket comprises or consists of a silicone material selected according to the criteria explained above. The tubular silicone jacket is formed with an internal diameter corresponding to the external diameter of the core periphery.

The core has a first length. The tubular jacket is preferably slightly longer, and is positioned on the core so that both end regions of the jacket project past the ends of the core. The end regions are bent or folded inwardly, at least partially covering the ends of the core.

In one fabrication method, the silicone jacket is molded, removed from the mold and then applied to the core. The jacket is preferably inverted during its application to the core so that its exterior, having mold marks, is inverted to become the interior of the jacket, and its smooth interior becomes the smooth exterior of the rolling pin jacket.

Other fabrication methods may of course be used to fabricate the silicone jacket and mount it to the core.

A plastic cap or a cap of another suitable material is then applied at each end of the core over the inwardly folded end regions of the silicone jacket. Alternatively, the silicone jacket may be bent inward so that its edge merely abuts and does not underlie the periphery of the end cap. The caps have a central hole that enables them to pass the roller shaft. There is a connection between each cap and the end of the core, such as deformable cooperating hooks or clips or other detents or connectors, that hold the caps to the core. The end regions of the jacket are pressed tightly by the caps.

The end cap and silicone jacket are thereby sealed together to form a unitary structure which prohibits infiltration of any other material, food, dirt, etc.

Handles for rolling the pin are attached at the ends of the shaft that passes through each end cap and through the core. The handles are held by a screw thread connection or a press-fit connection for example. Although the handles may be screwed on, they are preferably pressed onto non-threaded end regions of the shaft.

The rolling pin is used in the normal manner. Because of the silicone material in the jacket the material being rolled does not stick to the rolling pin, and the color of the silicone and therefore of the rolling pin can be freely selected.

Other features and advantages of the present invention will become apparent from the following description of embodiments of the invention which refers to the accompanying drawings.

BRIEF DESCRIPTION OF THE DRAWINGS

FIG. 1 is a perspective view of a silicone rolling pin according to a first embodiment of the invention.

FIG. 2 shows a cross-section of one end of the rolling pin of FIG. 1.

DETAILED DESCRIPTION OF EMBODIMENTS OF THE INVENTION

Figure 3:
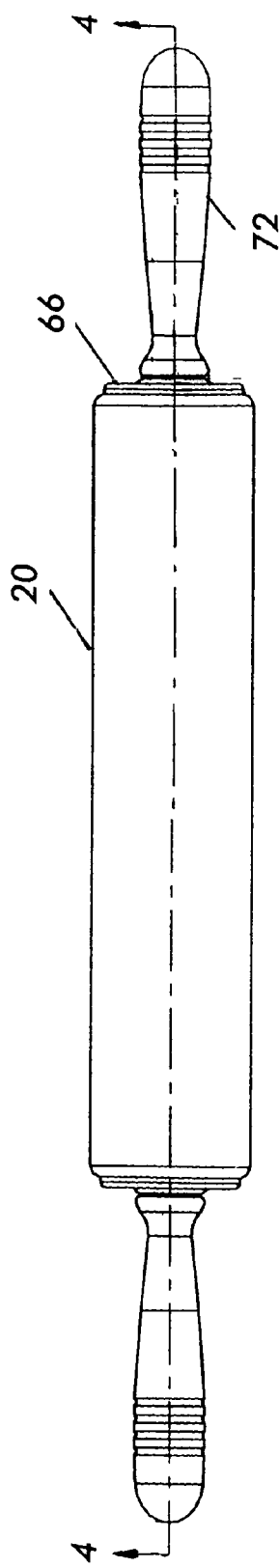
FIG. 3 is a side view of a rolling pin according to a second embodiment of the invention.

FIG. 1 is a perspective view of a silicone rolling pin, including a silicone jacket 4, caps 8 at the end regions of the silicone jacket 4, and handles 10. Other features of the rolling pin not specifically discussed, such as the core 2, may be substantially conventional.

FIG. 2 shows a cross-section of one end of the rolling pin, illustrating the various layers including the core 2, the silicone jacket 4, the end regions 6 of the silicone jacket, the caps 8 over the end regions (or in another embodiment, not shown, abutting the end regions) 6 of the silicone jacket and handles 10 with a screw threaded (or dowel) support 12 passing through the cap 8 and into the core 2, as one example of a mode of how to attach the handle to the rolling pin.

Figure 4:
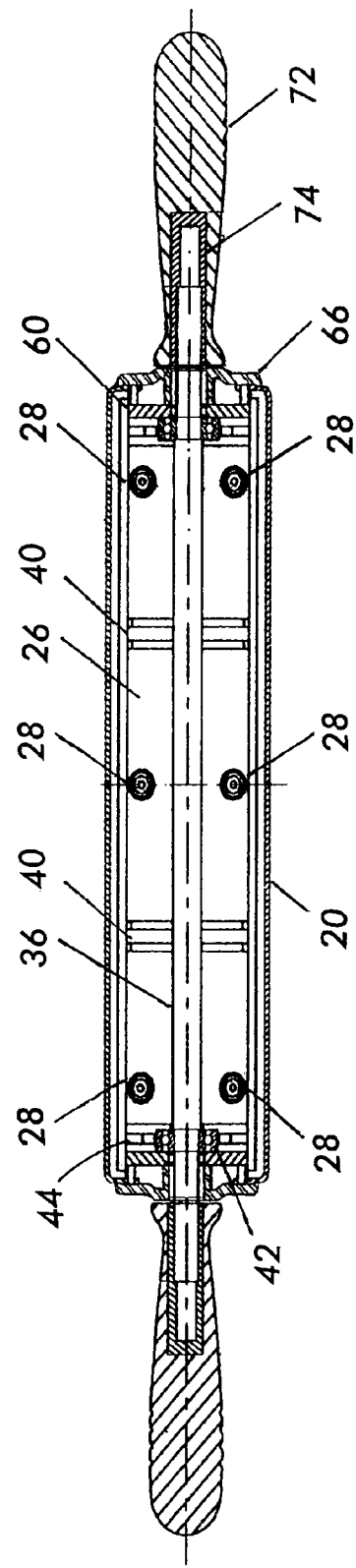
FIG. 4 is a longitudinal cross-sectional view of the rolling pin of FIG. 3.
Figure 5:
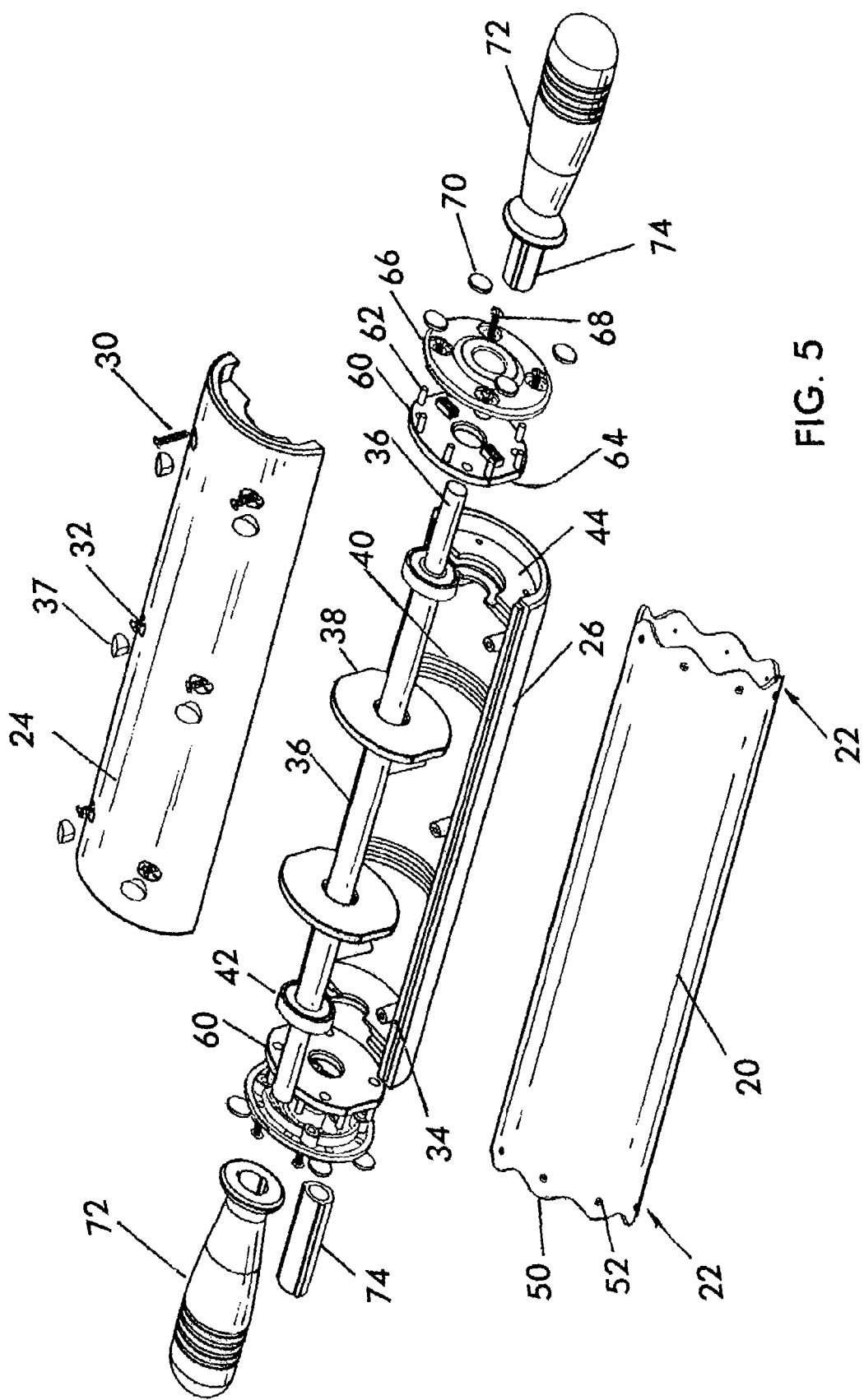
FIG. 5 is an exploded perspective view of the rolling pin of FIG. 3.

A second embodiment of the invention is shown in FIGS. 3, 4 and 5. FIG. 3 is a side view of a rolling pin having a jacket 20, end caps 66 and handles 72 similar to those in the first embodiment. Referring now to FIGS. 4 and 5, the core comprises two hollow half shells 24, 26 secured to each other by connectors 28 spaced along their abutting edges. In this embodiment, the connectors 28 comprise screws 30 which pass through countersunk screwholes 32 in the half shell 24 and into tapped portions 34 formed in the half shell 26. Caps 37 are provided for covering the screws 30 to make the outer surface of the half shell 24 smooth. A shaft 36 extends through the core 22. Spaced disks 38 are spaced apart along the shaft 36 and support the shell 24, 26 during use of the rolling pin. The disks 38 engage grooves 40 formed internally in both of the half shells 24 and 26. The shaft 36 is held in place lengthwise by a pair of bearings 42 which engage respectively pairs of flanges 44 formed internally near the two ends of the half shells 24, 26.

A silicone jacket 20 is disposed over the core, as described above. The silicone jacket has end regions 22 extending beyond the ends of the core. In this embodiment the end regions 22 may have scallops 50, and holes 52 corresponding respectively to the scallops 50, as discussed further below.

A pair of inner end caps 60 are disposed slightly inside the two ends of the core. Each inner end cap 60 has a plurality of pegs 62 which are arranged to correspond to the holes 52 formed in the jacket 20. Flats 64 on the inner end caps 60 engage the half shells 24, 26 to prevent relative movement.

The jacket 20 is placed on the core 24, 26 and the pegs 62 on the inner end caps 60 are passed through the holes 52 in the jacket. An outer end cap 66 is placed against the pegs 62 at each end of the core. The outer end caps 66 are secured to the core by screws 68 which pass through holes in the inner end caps 60 and are screwed into the flanges 44. Caps 70 cover the screws 68.

As best seen in FIG. 4, the outer end caps 66 overlie the end regions 22 of the jacket 20 so as to retain the end regions 22 on the pegs 62, thereby securing the jacket to the core.

Handles 72 are press fitted via sleeves 74 onto the ends of the shaft 36 that pass through the end caps 60, 66 and the core 24, 26. This is another example of a mode of attaching the handles to the rolling pin.

Thus, the half shells 24, 26, the disks 38, the end caps 60, 66 and the silicone jacket 20 form a unit which rotates together around the shaft 36 when the rolling pin is used for rolling dough. The handles 72, sleeves 74 and shaft form a second unit. Relative movability of the first and second units is provided by the bearings 42.

Figure 6:
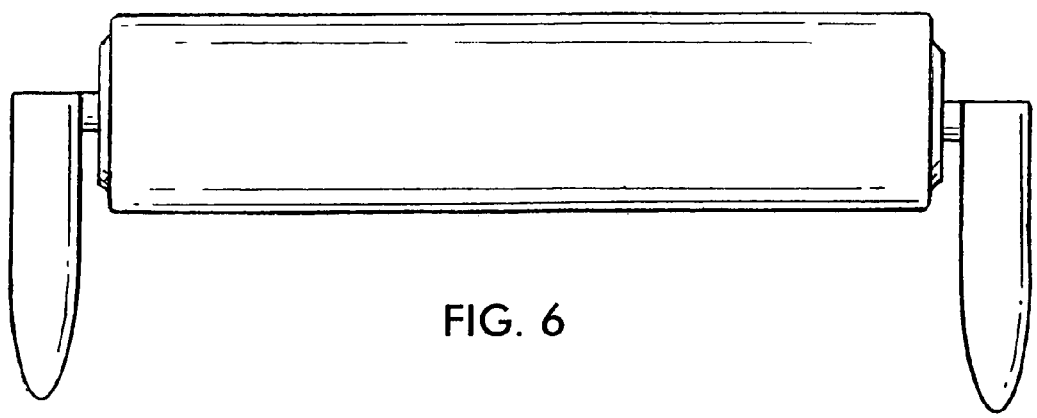
FIGS. 6-9 show alternate embodiments of the invention.
Figure 7:
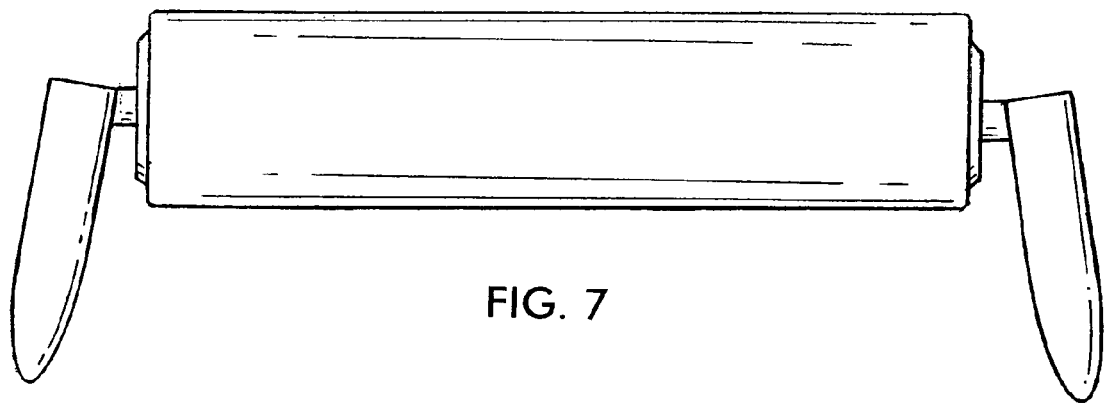
Figure 8:
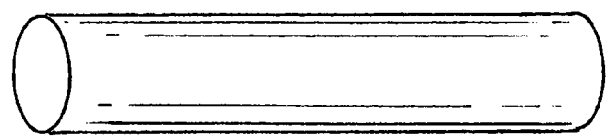
Figure 9:
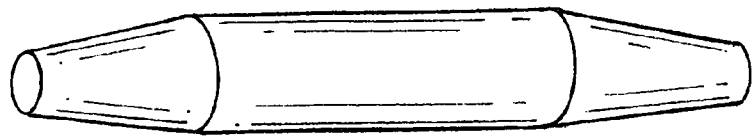

In other embodiments of the invention, shown in FIGS. 6 and 7, respectively, the handles may be mounted perpendicular or at another angle to the shaft for use in a confined space such as a narrow, deep baking pan. Further, a "baker style" rolling pin which is essentially shaped as a cylinder without handles (FIG. 8), or a "French style" rolling pin with tapered ends and again without handles (FIG. 9), are also within the scope of the invention.

Other equivalent arrangements may be substituted. For example, the bearing or bearings may be located at other locations along the core or in the handles. The shaft need not be continuous. The end caps may be replaced by any device or even an adhesive that is capable of holding the silicone jacket in place on the core.

Moreover, the jacket need not be manufactured as a separate element as shown, but may be formed directly on the core, such as by brushing, spraying, or molding.

Although the present invention has been described in relation to particular embodiments thereof, many other variations and modifications and other uses will become apparent to those skilled in the art. Therefore, the present invention is not limited by the specific disclosure herein.

What is claimed is:

1. A hand held rolling pin including a stiff support core, an elastomeric silicone-containing jacket separate from the core and disposed on the core defining a rolling surface, wherein the jacket consists essentially of food-grade silicone elastomer having a Shore A hardness in the range of about 45-60 and the rolling surface is flat without indentation, recess or relief that might retain material being rolled by the rolling pin, the rolling pin being free standing, including a part thereof configured to be held by or operated by a user's hand, and the rolling pin not being supported by other apparatus, such that the rolling pin may be moved and tilted in any direction by hand, and the pressure applied by the rolling pin may be adjustable by hand.

2. The rolling pin of claim 1, wherein said Shore A hardness is about 51.5.

3. The rolling pin of claim 1, wherein said jacket consists essentially of a mixture of GE Bayer Silicone #SE 6070 EU LV and #SE 6033 EU LV.

4. The rolling pin of claim 1, the core having ends and further comprising a cap connected at each end of the core and securing the jacket to the core.

5. The rolling pin of claim 1, the core having ends and the jacket being of such length and so positioned on the core as to define end regions of the jacket extending at least to the ends of the core.

6. The rolling pin of claim 5, wherein the jacket end regions are secured at the respective ends of the core.

7. The rolling pin of claim 5, the jacket end regions being folded inward over the ends of the core.

8. The rolling pin of claim 7, wherein holes are formed in the end regions of the jacket which are folded inwardly and engage corresponding pegs mounted on the core.

9. The rolling pin of claim 7, a cap securing to the core each folded inward end region of the jacket.

10. The rolling pin of claim 9, wherein the cap is disposed over the inwardly folded end regions of the silicone-containing jacket.

11. The rolling pin of claim 10, wherein holes are formed in the end regions of the jacket which are folded inwardly and engage corresponding pegs on the cap.

12. The rolling pin of claim 1, wherein the part to be held comprises a respective handle at each core end.

13. The rolling pin of claim 12, wherein the handles define a non-zero angle with respect to the shaft.

14. The rolling pin of claim 13, wherein the handles are perpendicular with respect to the shaft.

15. The rolling pin of claim 12, wherein each handle is secured to the core.

16. The rolling pin of claim 15, wherein a shaft passes between the handles and through the core, the core being rotatable about the shaft.

17. The rolling pin of claim 1, wherein said silicone-containing jacket consists essentially of a silicone material that is substantially chemically inert with respect to food to be rolled by the rolling pin, does not affect taste or smell of the food being rolled, is substantially non-stick and can be formed into a jacket to be applied on the core.

* * * * *